(12) United States Patent
Mabuchi et al.

(10) Patent No.: US 9,925,744 B2
(45) Date of Patent: Mar. 27, 2018

(54) INSULATING TAPE, METHOD FOR PRODUCING SAME, AND STATOR COIL

(71) Applicant: MITSUBISHI ELECTRIC CORPORATION, Chiyoda-ku (JP)

(72) Inventors: Takahiro Mabuchi, Chiyoda-ku (JP); Shigeyuki Yamamoto, Chiyoda-ku (JP); Makoto Tsukiji, Chiyoda-ku (JP); Hiroshi Sako, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 375 days.

(21) Appl. No.: 14/440,424

(22) PCT Filed: Dec. 11, 2013

(86) PCT No.: PCT/JP2013/083233
§ 371 (c)(1),
(2) Date: May 4, 2015

(87) PCT Pub. No.: WO2014/109167
PCT Pub. Date: Jul. 17, 2014

(65) Prior Publication Data
US 2015/0273800 A1    Oct. 1, 2015

(30) Foreign Application Priority Data

Jan. 10, 2013    (JP) .................. 2013-002355

(51) Int. Cl.
*H02K 21/00*    (2006.01)
*H02K 15/12*    (2006.01)
(Continued)

(52) U.S. Cl.
CPC .............. *B32B 19/048* (2013.01); *B32B 5/16* (2013.01); *B32B 5/30* (2013.01); *B32B 7/12* (2013.01);
(Continued)

(58) Field of Classification Search
CPC .................................. H02K 3/30; H02K 3/40
(Continued)

(56) References Cited

U.S. PATENT DOCUMENTS 4,476,192 A * 10/1984 Imai ..................... H01B 3/46
174/110 S
6,288,341 B1 * 9/2001 Tsunoda ................. H02K 3/40
174/120 C
(Continued)

FOREIGN PATENT DOCUMENTS

CN    1227389 A    9/1999
CN    101069249 A    11/2007
(Continued)

OTHER PUBLICATIONS

Machine Translation JP2008027819 (2008).*
(Continued)

*Primary Examiner* — Jose Gonzalez Quinones
(74) *Attorney, Agent, or Firm* — Oblon, McClelland, Maier & Neustadt, L.L.P.

(57) ABSTRACT

An insulating tape including: a mica layer containing mica; a reinforcing layer that is laminated onto the mica layer and contains a filler and a fibrous reinforcing material; and a flat sheet layer that is laminated onto the reinforcing layer and contains flat sheet-shaped inorganic particles having an aspect ratio of at least 30. In this insulating tape, the filler is supported in advance, and does not therefore flow out during manufacture of a stator coil, for example during hot-pressing. As a result, an insulating coating exhibiting high thermal conductivity can be formed.

10 Claims, 2 Drawing Sheets

(51) Int. Cl.
| | |
|---|---|
| *H02K 3/00* | (2006.01) |
| *H02K 3/34* | (2006.01) |
| *B32B 19/04* | (2006.01) |
| *H01B 3/04* | (2006.01) |
| *B32B 5/16* | (2006.01) |
| *B32B 5/30* | (2006.01) |
| *B32B 7/12* | (2006.01) |
| *H01B 17/60* | (2006.01) |
| *H01B 19/04* | (2006.01) |
| *H02K 3/30* | (2006.01) |
| *B32B 19/02* | (2006.01) |
| *B32B 27/20* | (2006.01) |
| *B32B 27/36* | (2006.01) |

(52) U.S. Cl.
CPC .............. *B32B 19/02* (2013.01); *B32B 19/04* (2013.01); *B32B 19/045* (2013.01); *B32B 27/20* (2013.01); *B32B 27/36* (2013.01); *H01B 3/04* (2013.01); *H01B 17/60* (2013.01); *H01B 19/04* (2013.01); *H02K 3/30* (2013.01); *H02K 3/34* (2013.01); *B32B 2260/021* (2013.01); *B32B 2260/046* (2013.01); *B32B 2262/101* (2013.01); *B32B 2264/10* (2013.01); *B32B 2264/102* (2013.01); *B32B 2264/104* (2013.01); *B32B 2264/107* (2013.01); *B32B 2307/206* (2013.01); *B32B 2307/302* (2013.01); *B32B 2307/304* (2013.01); *B32B 2457/00* (2013.01); *Y10T 428/251* (2015.01)

(58) Field of Classification Search
USPC ............................ 310/45, 179, 180, 208, 215
See application file for complete search history.

(56) References Cited

U.S. PATENT DOCUMENTS

| | | |
|---|---|---|
| 2004/0094325 A1 | 5/2004 | Yoshida et al. |
| 2006/0258791 A1 | 11/2006 | Okamoto et al. |
| 2007/0222307 A1 | 9/2007 | Sawa et al. |
| 2007/0222308 A1 | 9/2007 | Yoshida et al. |
| 2009/0078450 A1* | 3/2009 | Miller ........................ C09J 7/04 174/209 |

FOREIGN PATENT DOCUMENTS

| | | | |
|---|---|---|---|
| CN | 201556453 U | * | 8/2010 |
| EP | 1 220 240 A1 | | 7/2002 |
| JP | 62-104447 A | | 5/1987 |
| JP | 2-74548 A | | 3/1990 |
| JP | 2000-58314 A | | 2/2000 |
| JP | 2002-330562 A | | 11/2002 |
| JP | 2004-349115 A | | 12/2004 |
| JP | 2008-27819 A | | 2/2008 |
| JP | 2008027819 A | * | 2/2008 |
| JP | 2009-187817 A | | 8/2009 |
| WO | WO 01/16965 A1 | | 3/2001 |
| WO | WO 2005/069312 A1 | | 7/2005 |
| WO | WO 2007/037342 A1 | | 4/2007 |

OTHER PUBLICATIONS

Machine Translation CN201556453U (2010).*
Combined Chinese Office Action and Search Report dated Mar. 22, 2016 in Patent Application No. 201380064388.5 (with English language translation).
International Search Report dated Feb. 10, 2014, in PCT/JP2013/083233, filed Dec. 11, 2013.

* cited by examiner

INSULATING TAPE, METHOD FOR PRODUCING SAME, AND STATOR COIL

TECHNICAL FIELD

The present invention relates to an insulating tape used in a stator of a rotating electric machine, a method for producing same, and a stator coil.

BACKGROUND ART

Figure 4:
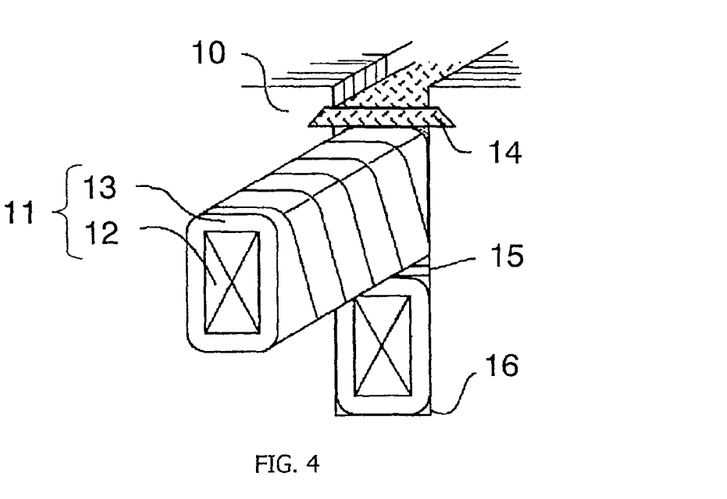
FIG. 4 is a perspective view of a stator.

As shown in FIG. 4, a stator of a rotating electric machine (in particular, a high-voltage rotating electric machine) includes a stator coil 11 housed in a plurality of slots 16 formed on an inner peripheral side of a stator core 10. The stator coil 11 is constituted by a coil conductor 12 and an insulating coating 13. The stator coil 11 is manufactured by wrapping an insulating tape, which is formed by gluing a fibrous reinforcing material such as glass cloth to a mica sheet, several times around the coil conductor 12, impregnating the resulting component with a resin composition under reduced pressure, and then applying hot-pressing to the resulting component while molding the component into a predetermined sectional shape. Two stator coils 11 are incorporated into upper and lower portions of the slot 16. A spacer 15 is provided between the stator coils 11, and a wedge 14 is provided in an open end portion of the slot 16. As a result, electromagnetic vibration generated from the stator coils 11 during operation of the rotating electric machine is suppressed.

In a stator of a rotating electric machine having this type of structure, the conductor coil 12 generates heat in response to a load current generated during operation of the rotating electric machine. In an indirect hydrogen-cooled rotating electric machine in particular, a majority of the heat generated from the conductor coil 12 is transmitted to a cooling gas via the stator core 10. Hence, to achieve an improvement in efficiency and reductions in size and cost in the rotating electric machine, the thermal conductivity of the insulating coating 13 of the stator coil 11 must be increased.

To increase the thermal conductivity of the insulating coating 13 of the stator coil 11, use of an insulating tape that includes a filler exhibiting high thermal conductivity has been proposed (see Patent Document 1, for example).

REFERENCE

Patent Document

Patent Document 1: Japanese Patent No. 4625615

DISCLOSURE OF THE INVENTION

Problems to be Solved by the Invention

An adhesive (a resin composition) is typically used to support the filler in the insulating tape. Further, during manufacture of the stator coil 11, the insulating tape is wrapped several times around the coil conductor 12, impregnated with the resin composition, and then hardened to form the integrated insulating coating 13. Therefore, the adhesive used to support the filler and the resin used for impregnation must be compatible.

With conventional insulating tape, however, during manufacture of the stator coil 11 (during the hot-pressing in particular), the filler flows out through gaps in the insulating tape wrapped around the coil conductor 12 together with the resin composition used for impregnation, and as a result, the thermal conductivity of the formed insulating coating is not sufficiently increased.

The present invention has been designed to solve the problem described above, and an object thereof is to provide an insulating tape and a method for producing same with which a filler supported in advance is prevented from flowing out during manufacture of a stator coil (during hot-pressing in particular), whereby an insulating coating exhibiting high thermal conductivity can be formed.

Another object of the present invention is to provide a stator coil having an insulating coating that exhibits high thermal conductivity.

Means for Solving the Problems

The present inventors found, as a result of committed research undertaken with the aim of solving the problem described above, that by covering a reinforcing layer that is formed on a mica later and contains a filler exhibiting high thermal conductivity with a flat sheet layer containing specific flat sheet-shaped inorganic particles, the filler can be effectively prevented from flowing out during manufacture of a stator coil (during hot-pressing in particular).

More specifically, the present invention is an insulating tape including: a mica layer containing mica; a reinforcing layer that is laminated onto the mica layer and contains a filler and a fibrous reinforcing material; and a flat sheet layer that is laminated onto the reinforcing layer and contains flat sheet-shaped inorganic particles having an aspect ratio of at least 30.

Further, the present invention is a method for producing an insulating tape, including the steps of: forming a mica layer by forming a dispersion containing mica into a sheet; forming a reinforcing layer by gluing a fibrous reinforcing material to the mica sheet and then coating the fibrous reinforcing material with a slurry containing a filler; and forming a flat sheet layer by coating the reinforcing layer with a slurry containing flat sheet-shaped inorganic particles having an aspect ratio of at least 30.

Furthermore, the present invention is a stator coil including: a coil conductor; and an insulating coating including the aforesaid insulating tape, which is wrapped around an outer peripheral portion of the coil conductor and integrated with the coil conductor by a resin.

Effects of the Invention

According to the present invention, it is possible to provide an insulating tape and a manufacturing method thereof with which a filler supported in advance is prevented from flowing out during manufacture of a stator coil (during hot-pressing in particular), whereby an insulating coating exhibiting high thermal conductivity can be formed.

Further, according to the present invention, it is possible to provide a stator coil having an insulating coating that exhibits high thermal conductivity.

BEST MODE FOR CARRYING OUT THE INVENTION

Embodiment 1

Figure 1:
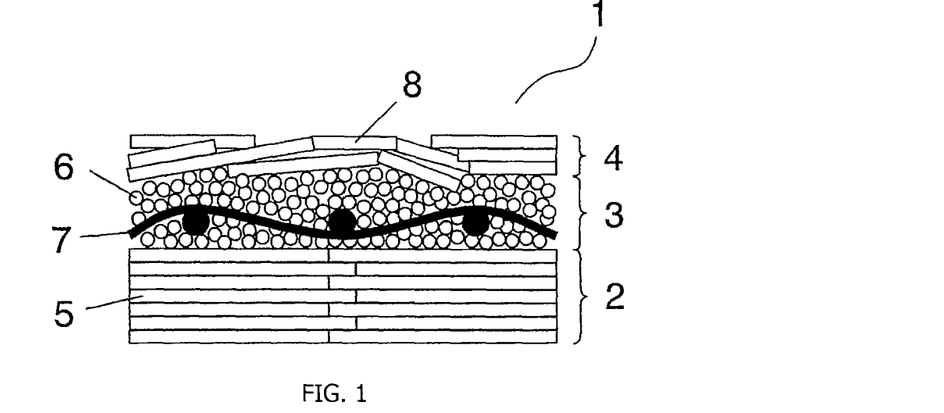
FIG. 1 is a schematic sectional view showing an insulating tape according to Embodiment 1.

FIG. 1 is a schematic sectional view showing an insulating tape according to Embodiment 1 of the present invention. In FIG. 1, an insulating tape 1 includes a mica layer 2, a reinforcing layer 3 laminated onto the mica layer 2, and a flat sheet layer 4 laminated onto the reinforcing layer 3.

The mica layer 2 contains mica 5. There are no particular limitations on the mica 5, but hard mica (muscovite) and soft mica (phlogopite), which are known as types of sheet silicate minerals, or the like, for example, may be used. There are no particular limitations on the form of the mica 5, but mica block, mica splittings, reconstituted mica, and so on, for example, may be used. These forms may be used singly or in combinations of two or more. Among these forms, reconstituted mica, which has an even thickness and is inexpensive, is preferably used.

The mica layer 2 may contain a resin such as epoxy resin, silicone resin, or phenol resin in addition to the mica 5. These resins bind the mica 5, and as a result, the mica layer 2 can be improved in strength. Further, during manufacture of a stator coil, the resins are preferably chemically bonded to a resin composition used for impregnation so that the resins and the resin composition are integrated. Accordingly, the type of resin is preferably selected in consideration of the reactivity thereof with the resin composition used for impregnation.

Alternatively, various resin films may be used as a support material for the mica layer 2. There are no particular limitations on the resin film, and a conventional resin film known in the technical field may be used.

Further, in consideration of the electrical insulating properties of the stator coil, the content of the mica 5 in the insulating tape 1 is preferably no less than 100 g and no more than 200 g per 1 mm$^2$ of the insulating tape 1. When the content of the mica 5 is less than 100 g, it may be impossible to obtain the desired electrical insulating property, and as a result, dielectric breakdown time during charge deterioration may be shortened. When the content of the mica 5 exceeds 200 g, on the other hand, although favorable electrical insulating properties are obtained, the insulating tape 1 may become too thick, making it difficult to wrap the insulating tape 1 around a coil conductor. Furthermore, when the thickness of the insulating tape 1 is set to be constant, a relative reduction may occur in the filling ratio of a filler 6 that is effective in increasing thermal conductivity, and as a result, it may be impossible to form an insulating coating having the desired thermal conductivity.

There are no particular limitations on the thickness of the mica layer 2, and the thickness thereof may be adjusted appropriately in accordance with the size and so on of the manufactured insulating tape 1. The thickness of the mica layer 2 is preferably between 60 μm and 150 μm, and more preferably between 80 μm and 120 μm.

The reinforcing layer 3 includes the filler 6 and a fibrous reinforcing material 7.

There are no particular limitations on the filler 6, and a conventional filler known in the technical field may be used. Examples of the filler 6 include alumina, magnesium oxide, zinc oxide, magnesium carbonate, graphite, carbon tube, boron nitride, titanium boride, silicon carbide, silicon nitride, crystalline silica, aluminum nitride, and so on. These materials may be used singly or in combination.

As regards the thermal conductivity of the insulating coating, the filler 6 preferably exhibits a thermal conductivity of at least 5 W/mK. When the thermal conductivity is less than 5 W/mK, the thermal conductivity of the insulating coating may not increase sufficiently.

In consideration of the impregnating ability of the resin composition, a volumetric filling ratio of the filler 6 in the insulating tape 1 is set at no more than 50 percent by volume. When the volumetric filling ratio exceeds 50 percent by volume, the resin composition may not impregnate the insulating tape 1 sufficiently during manufacture of the stator coil, and as a result, the desired characteristics may not be obtained.

Among the various types of fillers 6, boron nitride is preferable since the thermal conductivity of the insulating coating can be increased by adding only a small amount (a small support amount) of boron nitride, and therefore the thickness of the insulating tape 1 does not have to be increased.

Primary particles of boron nitride have a laminar structure similar to graphite. The particle shape thereof is scale-like, and the particles exhibit anisotropic thermal conductivity such that the thermal conductivity is high in the long diameter direction and low in the short diameter direction. Therefore, when primary particles of boron nitride are used as the filler 6, depending on manufacturing conditions of the insulating tape 1 it may be impossible, due to the anisotropic thermal conductivity of the boron nitride, to obtain an insulating coating having the desired thermal conductivity.

Hence, to prevent a reduction in the thermal conductivity of the insulating coating caused by the anisotropic thermal conductivity of primary particles of boron nitride, secondary agglomerates obtained by agglomerating primary particles of boron nitride are particularly preferably used.

There are no particular limitations on the method of manufacturing the secondary agglomerates, and a conventional method known in the technical field may be employed. For example, the secondary agglomerates may be manufactured by agglomerating primary particles of boron nitride using an inorganic binder. There are no particular limitations on the inorganic binder, and examples thereof include boric acid, a borate of an alkaline earth metal (calcium borate, magnesium borate, sodium borate, or potassium borate), silicate soda, aluminum phosphate, and so on.

To prevent anisotropic thermal conductivity, an orientation index of the secondary agglomerates, or in other words a strength ratio (I<002>/I<100>) of an X-ray diffraction peak of a <002> plane of the secondary agglomerates relative to a <100> plane, is preferably no more than 15. When the strength ratio of the X-ray diffraction peak of the secondary agglomerates exceeds 15, the proportion of the secondary agglomerates in which the primary particles are oriented in a specific direction may increase, making it impossible to obtain an insulating coating having the desired thermal conductivity.

The average particle diameter of the filler 6 is preferably no more than 80 μm. When the average particle diameter of the filler 6 exceeds 80 μm, the insulating tape 1 may become too thick, making it difficult to wrap the insulating tape 1 around the coil conductor. Further, when the thickness of the insulating tape 1 is set to be constant, the filling ratio of the mica 5 that generates the insulating property must be relatively reduced, and as a result, the electrical insulating characteristic of the insulating coating may decrease. Here, the average particle diameter of the filler 6 denotes an average particle diameter determined by performing a particle distribution measurement using a laser diffraction/scattering method, or more specifically an average particle diameter measured using a commercially available laser diffraction/scattering type particle distribution gauge.

There are no particular limitations on the fibrous reinforcing material 7, and a conventional material known in the technical field may be used. Here, the fibrous reinforcing material 7 is a cloth formed by weaving a plurality of warp threads manufactured by bundling a plurality of fibers and a plurality of weft threads manufactured by bundling a plurality of fibers into a lattice shape. Examples of the fibrous reinforcing material 7 include glass cloth, alumina cloth, silica cloth, and so on, for example. Among these, glass cloth is optimal in terms of strength and cost, and is therefore preferably used as the fibrous reinforcing material 7.

The fibrous reinforcing material 7 includes a plurality of openings surrounded by warp threads and weft threads. On the reinforcing layer 3, the filler 6 is trapped in the openings. As a result, movement of the filler 6 in a layer interior direction is suppressed.

There are no particular limitations on the thickness of the fibrous reinforcing material 7, but the thickness is preferably no more than 80 μm. When the thickness of the fibrous reinforcing material 7 exceeds 80 μm, the insulating tape 1 may become too thick, making it difficult to wrap the insulating tape 1 around the coil conductor. Further, when the thickness of the insulating tape 1 is set to be constant, the filling ratio of the mica 5 that generates the insulating property must be relatively reduced, and as a result, the electrical insulating characteristic of the insulating coating may decrease.

The reinforcing layer 3 may contain a resin such as epoxy resin, silicone resin, or phenol resin in addition to the filler 6 and the fibrous reinforcing material 7. Note that the resin used in the reinforcing layer 3 may be identical in composition to the resin used in the mica layer 2.

The flat sheet layer 4 contains flat sheet-shaped inorganic particles 8 having an aspect ratio of at least 30. By setting the aspect ratio of the flat sheet-shaped inorganic particles 8 at or above 30, the flat sheet layer 4 can be formed such that the flat sheet-shaped inorganic particles 8 are laminated. Therefore, when pressure is applied to the insulating tape 1, a movement path of the filler 6 through the reinforcing layer 3 existing below the flat sheet layer 4 is effectively blocked, and as a result, the filler 6 can be prevented from flowing out.

Here, the aspect ratio of the flat sheet-shaped inorganic particles 8 denotes a value obtained by dividing the longest diameter of the flat sheet-shaped inorganic particles 8 by the shortest diameter (i.e. the thickness) thereof. Further, the longest side of the flat sheet-shaped inorganic particles 8 when disposed to maximize a projected area thereof is set as the longest diameter, the thickness thereof is set as the shortest diameter, and an average of the long sides is set as an average long diameter. The longest diameter, the shortest diameter (the thickness), and the average long diameter can be measured using an electron microscope or the like.

The aspect ratio of the flat sheet-shaped inorganic particles 8 is preferably an average value of 100 of the flat sheet-shaped inorganic particles 8. Hence, as long as the average value of the aspect ratio of the flat sheet-shaped inorganic particles 8 is at least 30, flat sheet-shaped inorganic particles 8 having a smaller aspect ratio than 30 may be included therein.

Further, during manufacture of the stator coil, the insulating tape 1 is wrapped around an outer peripheral portion of the coil conductor, and therefore, when the aspect ratio of the flat sheet-shaped inorganic particles 8 is too large, the insulating tape 1 cannot be easily wrapped around the outer peripheral portion of the coil conductor. Hence, to ensure that both the filler 6 is effectively prevented from flowing out and the insulating tape 1 can be wrapped easily, the aspect ratio of the flat sheet-shaped inorganic particles 8 is preferably between 50 and 300.

There are no particular limitations on the flat sheet-shaped inorganic particles 8, and conventional particles known in the technical field may be used. Among such particles, the flat sheet-shaped inorganic particles 8 are preferably incompatible or poorly compatible with the resin used for impregnation. Preferred examples of the flat sheet-shaped inorganic particles 8 include laminar ferrous silicate minerals such as mica, kaolin, pyrophyllite, sericite, and talc, glass flakes, glass plate, aluminum flakes, boehmite, alumina, and so on. These particles may be used singly or in combination.

Among these various types of flat sheet-shaped inorganic particles 8, mica often has a large aspect ratio (an average long diameter of 100 to 500 μm and a thickness of no more than 1 μm), and also exhibits a superior electrical insulating property. Hence, mica is preferably used as the flat sheet-shaped inorganic particles 8.

There are no particular limitations on the mass per unit area (the mass per unit area (1 $m^2$)) of the flat sheet-shaped inorganic particles 8 in the insulating tape 1, but in consideration of the thickness of the insulating tape 1 and the movement prevention effect in relation to the filler 6, the mass per unit area is preferably between 1 $g/m^2$ and 50 $g/m^2$.

Figure 2:
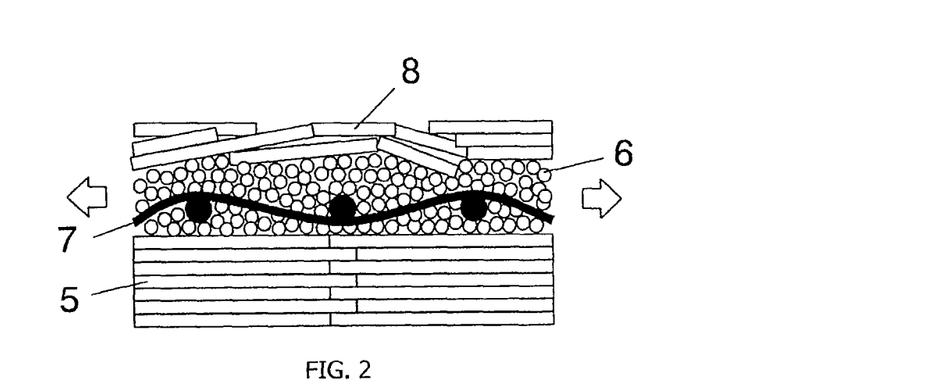
FIG. 2 is a view illustrating a condition occurring when pressure is applied to the insulating tape of FIG. 1 after impregnating the insulating tape with a resin composition.

As shown in FIG. 2, the flat sheet layer 4 covers the surface of the reinforcing layer 3, and therefore few paths along which the filler 6 contained in the reinforcing layer 3 can flow out exist (arrows in the drawing indicate the outflow paths of the filler 6). Hence, during manufacture of the stator coil (during hot-pressing in particular), the filler 6 is unlikely to flow out together with the resin composition used for impregnation, and as a result, an insulating coating having the desired thermal conductivity can be formed.

Figure 3:
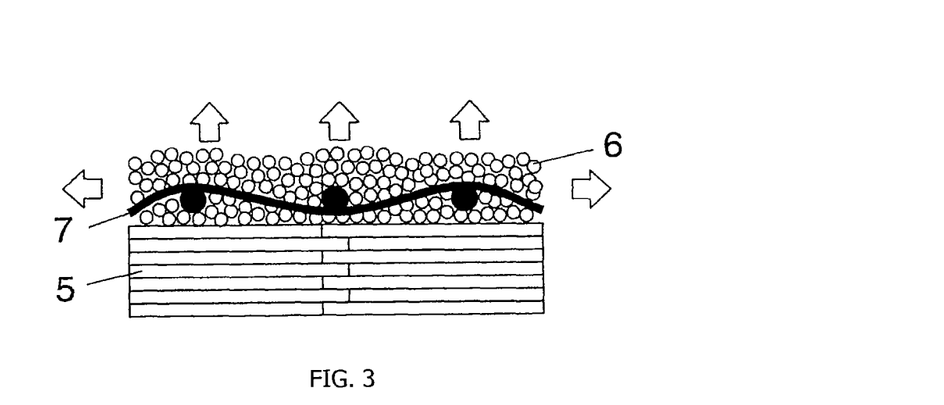
FIG. 3 is a view illustrating a condition occurring when pressure is applied to an insulating tape (an insulating tape on which a flat sheet layer is not formed) impregnated with a resin composition.

When, on the other hand, the flat sheet layer 4 does not exist, as shown in FIG. 3, a large number of paths along which the filler 6 contained in the reinforcing layer 3 can flow out exist (arrows in the drawing indicate the outflow paths of the filler 6). Hence, during manufacture of the stator coil (during hot-pressing in particular), the filler 6 flows out together with the resin composition used for impregnation, and as a result, an insulating coating having the desired thermal conductivity cannot be formed.

In the flat sheet layer 4, as shown in FIG. 2, the flat sheet-shaped inorganic particles 8 of the flat sheet layer 4 act as a wall that prevents the filler 6 from flowing out. During manufacture of the stator coil (during hot-pressing in particular), the flat sheet-shaped inorganic particles 8 in the flat sheet layer 4 bend in a complicated fashion in accordance with the shape of the coil conductor. The flat sheet-shaped inorganic particles 8 bend in a steadily more complicated fashion as the average long diameter of the flat sheet-shaped inorganic particles 8 increases, and as a result, the filler 6 can be effectively prevented from flowing out between the flat sheet-shaped inorganic particles 8.

Hence, to effectively prevent the filler 6 from flowing out between the flat sheet-shaped inorganic particles 8, the average long diameter of the flat sheet-shaped inorganic particles 8 is preferably no less than 80 μm.

Further, the average long diameter of the flat sheet-shaped inorganic particles 8 is preferably longer than the average particle diameter of the filler 6. When the average long diameter of the flat sheet-shaped inorganic particles 8 is longer than the average particle diameter of the filler 6, the filler 6 can be prevented from flowing out between the flat sheet-shaped inorganic particles 8 even more effectively.

When the inorganic particles in the flat sheet layer 4 take another shape, such as a spherical shape, the inorganic particles in the flat sheet layer 4 move in accordance with the shape of the coil conductor during manufacture of the stator coil (in particular when the insulating tape 1 is wrapped around the coil conductor), leading to large gaps between the inorganic particles in the flat sheet layer 4. Accordingly, the filler 6 contained in the reinforcing layer 3 is more likely to flow out together with the resin composition used for impregnation during manufacture of the stator coil (during hot-pressing in particular), and as a result, an insulating coating having the desired thermal conductivity cannot be formed.

The flat sheet layer 4 may contain a resin such as epoxy resin, silicone resin, or phenol resin in addition to the flat sheet-shaped inorganic particles 8. Note that the resin used in the flat sheet layer 4 may be identical in composition to the resin used in the mica layer 2 and the reinforcing layer 3.

There are no particular limitations on the thickness of the flat sheet layer 4, but the thickness is preferably no more than 80 µm, and more preferably no more than 30 µm. When the thickness of the flat sheet layer 4 exceeds 80 µm, the insulating tape 1 may become too thick, making it difficult to wrap the insulating tape 1 around the coil conductor.

Next, a method of manufacturing the insulating tape 1 will be described.

First, the mica layer 2 is formed by forming a dispersion containing the mica 5 into a sheet.

There are no particular limitations on the method of preparing the dispersion containing the mica 5, and a conventional method known in the technical field may be used. For example, the dispersion may be prepared by dispersing the mica 5 through water. There are no particular limitations on the content of the mica 5 in the dispersion, and the content may be adjusted appropriately in accordance with the type of the mica 5 and so on.

There are no particular limitations on the method of forming the dispersion into a sheet, and a conventional method known in the technical field may be used. For example, a mica sheet serving as the mica layer 2 may be obtained by forming the dispersion into a sheet using a commercially available paper machine.

At this time, the mica sheet may be glued to various types of films serving as a separate support material. When the mica sheet is glued to a support material, the mica sheet may be coated with a resin composition using a conventional method such as a roll coater method or a spraying method, and then glued to the support material.

The resin composition used to glue the mica sheet to the support material typically includes a thermosetting resin, a hardener, and a solvent.

There are no particular limitations on the thermosetting resin, and a conventional thermosetting resin known in the technical field may be used. Examples of thermosetting resins include epoxy resin, unsaturated polyester resin, phenol resin, melamine resin, silicone resin, polyimide resin, and so on. Among these resins, epoxy resin exhibits superior characteristics such as heat resistance and adhesiveness, and is therefore preferably used as the thermosetting resin.

Examples of epoxy resins include bisphenol A type epoxy resin, bisphenol F type epoxy resin, ortho cresol novolac type epoxy resin, phenol novolac type epoxy resin, cycloaliphatic epoxy resin, glycidyl-aminophenol-based epoxy resin, and so on. These resins may be used singly or in combinations of two or more.

There are no particular limitations on the hardener, and a conventional hardener known in the technical field may be used. Examples of hardeners include organometallic complexes and organometallic salts of metals such as cobalt, copper, zinc, iron, nickel, manganese, and tin. Specific examples of organometallic complexes include organic cobalt complexes such as cobalt (II) acetylacetonate and cobalt (III) acetylacetonate, organic copper complexes such as copper (II) acetylacetonate, organic zinc complexes such as zinc (II) acetylacetonate, organic iron complexes such as iron (III) acetylacetonate, organic nickel complexes such as nickel (II) acetylacetonate, organic manganese complexes such as manganese (II) acetylacetonate, and so on. Examples of organometallic salts include zinc octoate, tin octoate, zinc naphthenate, cobalt naphthenate, tin stearate, zinc stearate, and so on. Of these materials, cobalt (II) acetylacetonate, cobalt (III) acetylacetonate, zinc (II) acetylacetonate, zinc naphthenate, and iron (III) acetylacetonate are preferable due to their hardening performance and solvent solubility, while cobalt (II) acetylacetonate and zinc naphthenate are more preferable. These materials may be used singly or in combinations of two or more.

The blending amount of the hardener must be set appropriately in accordance with the type of thermosetting resin, hardener, and so on to be used. Typically, however, the hardener blending amount is from 0.1 pts. by mass to 200 pts. by mass, based on 100 pts. by mass of the thermosetting resin.

There are no particular limitations on the solvent, and a conventional solvent known in the technical field may be used. Examples of solvents include organic solvents such as toluene and methyl ethyl ketone. These solvents may be used singly or in combinations of two or more.

There are no particular limitations on the blending amount of the solvent, and the solvent blending amount may be adjusted appropriately in accordance with the desired viscosity of the resin composition.

Next, the reinforcing layer 3 is formed by gluing the fibrous reinforcing material 7 to the mica sheet and then coating the fibrous reinforcing material 7 with a slurry containing the filler 6.

There are no particular limitations on the method of gluing the fibrous reinforcing material 7 to the mica sheet, and a conventional method known in the technical field may be used. For example, the mica sheet and the fibrous reinforcing material 7 may be glued together using a resin composition. More specifically, the fibrous reinforcing material 7 is coated with the resin composition using a conventional method such as a roll coater method or a spraying method, and after volatilizing a solvent contained in the resin composition, the mica sheet is laminated thereon. The resulting laminated component may then be pressure-bonded by applying pressure thereto using a heated roll or the like under heating to 60 to 70° C.

There are no particular limitations on the slurry containing the filler 6, and a slurry obtained by blending the filler 6 with a resin composition, for example, may be used. The resin composition used in the slurry may be identical to the resin composition used to glue the mica sheet to the support material. The blending amount of the filler 6 must be set appropriately in accordance with the type of thermosetting resin, hardener, and so on to be used. Typically, however, the blending amount is from 20 pts. by mass to 200 pts. by mass, based on 100 pts. by mass of the thermosetting resin.

There are no particular limitations on the method of applying the slurry containing the filler 6, and a conventional method known in the technical field may be used. Examples of application methods include a spraying method, a roll coater method, a gravure transfer method, and so on.

The applied slurry is cut using a conventional method such as a doctor blade method, and then pressed using a heat roll or the like under heating to 60 to 70° C. In so doing, the reinforcing layer 3 can be formed evenly at the desired thickness.

Examples of materials of the doctor blade include metal, ceramic, plastic, and so on, but in terms of workability and wear resistance, chrome plated steel is preferably used.

Further, there are no particular limitations on the cutting conditions, but the clearance (gap) between the mica sheet and the doctor blade is preferably between 0.01 and 0.1 mm, the cutting temperature is preferably between 10 and 40° C., and the cutting speed (travel speed of the mica sheet relative to the doctor blade) is preferably no higher than 5 m/minute. When the gap is smaller than 0.01 mm, the fibrous reinforcing material 7 may peel away. When the gap exceeds 0.1 mm, on the other hand, the reinforcing layer 3 becomes too thick. Further, when the cutting temperature is lower than 10° C., the coating may increase in viscosity such that cutting cannot be performed smoothly. When the cutting temperature exceeds 40° C., on the other hand, the volatilization speed of the solvent contained in the coating increases so that the coating cannot be cut to an even thickness.

Next, the flat sheet layer 4 is formed by coating the reinforcing layer 3 with a slurry containing the flat sheet-shaped inorganic particles 8.

There are no particular limitations on the slurry containing the flat sheet-shaped inorganic particles 8, and a mixture of the flat sheet-shaped inorganic particles 8 and a solvent, for example, may be used.

There are no particular limitations on the solvent, and a conventional solvent known in the technical field may be used. Examples of solvents include organic solvents such as toluene and methyl ethyl ketone. These solvents may be used singly or in combinations of two or more.

There are no particular limitations on the blending amount of the solvent, and the solvent blending amount may be adjusted appropriately in accordance with the ease of application of the slurry.

There are no particular limitations on the method of applying the slurry containing the flat sheet-shaped inorganic particles 8, and a conventional method known in the technical field may be used. Examples of application methods include a spraying method, a roll coater method, and so on.

After applying the slurry containing the flat sheet-shaped inorganic particles 8, the flat sheet layer 4 can be formed by heating the resulting component to a predetermined temperature in order to volatilize the solvent.

In the insulating tape 1 obtained in the manner described above, the reinforcing layer 3 is covered by the flat sheet layer 4, and therefore the filler 6 supported in advance in the reinforcing layer 3 is unlikely to flow out during manufacture of the stator coil (during hot-pressing in particular). As a result, an insulating coating that exhibits high thermal conductivity can be formed.

Embodiment 2

A stator coil according to Embodiment 2 of the present invention includes a coil conductor and the insulating tape 1 according to Embodiment 1, which is wound around an outer peripheral portion of the coil conductor, and the insulating tape 1 includes an insulating coating that is integrated with the coil conductor by resin. A main feature of the stator coil according to this Embodiment is the insulating tape used therein, and known conventional configurations (the configurations shown in FIG. 4, for example) may be employed for all other configurations.

The stator coil thus structured is manufactured as follows.

First, the insulating tape 1 is wound a plurality of times around the outer peripheral portion of the coil conductor, which is formed by bundling a plurality of wire conductors coated with an insulating coating, such that a part thereof overlaps (a part corresponding to half the width of the insulating tape 1, for example). Here, there are no particular limitations on the wires forming the coil conductor as long as the wires are conductive, and wires formed from copper, aluminum, silver, and so on may be used.

Next, the insulating tape 1 wound around the coil conductor is impregnated with a resin composition. Here, there are no particular limitations on the resin composition used for impregnation, but the resin composition typically contains a thermosetting resin and a hardener.

There are no particular limitations on the thermosetting resin, and one of the thermosetting resins cited in Embodiment 1 may be used.

There are no particular limitations on the hardener, and a conventional hardener known in the technical field may be used. Examples of hardeners include: cycloaliphatic anhydrides such as methyl tetra hydro phthalic anhydride, methyl hexa hydro phthalic anhydride, and himic anhydride; aliphatic acid anhydrides such as dodecenyl succinic anhydride; aromatic anhydrides such as phthalic anhydride and trimellitic anhydride; organic dihydrazides such as dicyandiamide and adipic acid dihydrazide; tris (dimethylaminomethly) phenol; dimethyl benzyl amine; 1,8-diaza-bicyclo (5, 4, 0) undecene and derivatives thereof; imidazoles such as 2-methylimidazole, 2-ethyl-4-methylimidazole, and 2-phenylimidazole; and so on. These hardeners may be used singly or in combinations of two or more.

The blending amount of the hardener must be set appropriately in accordance with the type of thermosetting resin, hardener, and so on to be used. Typically, however, the blending amount of the hardener is from 0.1 pts. by mass to 200 pts. by mass, based on 100 pts. by mass of the thermosetting resin.

There are no particular limitations on the method of impregnating the insulating tape 1 with the resin composition, and a conventional method known in the technical field may be used. Examples of impregnation methods include vacuum impregnation, vacuum pressure impregnation, normal pressure impregnation, and so on. There are no particular limitations on the conditions established during impregnation, and the conditions may be adjusted appropriately in accordance with the type of the used resin composition and so on.

After impregnating the insulating tape 1 with the resin composition, pressure is applied to the insulating tape 1 by clamping the coil conductor from the outer side of the insulating tape 1.

Next, the resin composition with which the insulating tape 1 is impregnated is hardened by applying heat or the like to the insulating tape 1. As a result, the stator coil is completed.

In the stator coil according to this Embodiment, the insulating tape 1 in which the surface of the reinforcing layer 3 is covered by the flat sheet layer 4 is used, and therefore, as shown in FIG. 2, the filler 6 included in the reinforcing layer 3 is unlikely to flow out together with the resin composition used for impregnation even when pressure is applied to the insulating tape 1. As a result, the thermal conductivity of the insulating coating can be improved. When, on the other hand, an insulating tape in which the surface of the reinforcing layer 3 is not covered by the flat sheet layer 4 is used, as shown in FIG. 3, the filler 6 included in the reinforcing layer 3 flows out together with the resin composition used for impregnation, and as a result, the thermal conductivity of the insulating coating decreases.

In the stator coil according to this Embodiment, manufactured as described above, the filler 6 supported in advance is unlikely to flow out during manufacture of the stator coil (during hot-pressing in particular), and therefore the thermal conductivity of the insulating coating can be improved.

EXAMPLES

The present invention will be described in further detail below using examples and comparative examples. Note, however, that the present invention is not limited to these examples.

Example 1

A mica sheet (a mica layer) was obtained by dispersing reconstituted mica powder through water to form a dispersion of reconstituted mica powder, and then forming the dispersion into a sheet using a paper machine.

Next, a mica sheet including a support material was obtained at an overall thickness of 0.1 mm by coating the mica sheet with a resin composition formed by dissolving 100 pts. by mass of bisphenol A type epoxy resin (product name Epicode 834, manufactured by Japan Epoxy Resins Co., Ltd.) and 10 pts. by mass of zinc naphthenate into 400 pts. by mass of methyl ethyl ketone using a roll coater method, and then laminating and gluing a support material (a polyester film having a width of 1000 mm, a thickness of 0.02 mm, and a predetermined length) thereon.

Next, a glass cloth (having a width of 1000 mm, a thickness of 30 μm, a predetermined length, and an aperture ratio of 97%) serving as a fibrous reinforcing material was coated with a resin composition formed by dissolving 100 pts. by mass of bisphenol A type epoxy resin (product name Epicode 834, manufactured by Japan Epoxy Resins Co., Ltd.) and 10 pts. by mass of zinc naphthenate into 1000 pts. by mass of methyl ethyl ketone using a roll coater method, whereupon the solvent was volatilized. The mica sheet including the support material was then laminated and glued thereon such that contact was established between the coating and the mica sheet, whereupon the resulting component was pressure-bonded by applying pressure using a heater roll heated to 60° C.

Next, a resin composition (a slurry) was prepared by mixing together 150 pts. by mass of bisphenol A type epoxy resin (product name Epicode 834, manufactured by Japan Epoxy Resins Co., Ltd.), 15 pts. by mass of zinc naphthenate, 200 pts. by mass of secondary agglomerates of boron nitride (having an average particle diameter of 75 μm, an X-ray diffraction peak strength ratio (I<002>/I<100>) of 10, and a thermal conductivity of 50 W/mK), and 1000 pts. by mass of methyl ethyl ketone.

Next, the glass cloth surface of the laminated component described above was coated with this resin composition using a spraying method. Next, a reinforcing layer was formed by cutting the coated component using a doctor blade made of chrome plated steel under conditions of a gap of 0.01 mm, a cutting speed of 3 m/minute, and a cutting temperature of 25° C., and then applying pressure using a heated roll heated to 60° C.

Next, a slurry was prepared by mixing together 10 pts. by mass of mica particles serving as flat sheet-shaped inorganic particles (having a long diameter of 200 μm and a thickness of 1 μm) and 100 pts. by mass of methyl ethyl ketone. A flat sheet layer was then formed by coating a surface of the reinforcing layer with this slurry using a spraying method, heating the coated component at 80° C., and then drying the component.

The obtained insulating tape was cut to a width of 30 mm for use in tests described below.

Next, the insulating tape was wound in a half-overlapping fashion up to a thickness of 4.4 mm around a coil conductor of 50 mm×12 mm×1140 mm.

Next, the insulating tape wound around the coil conductor was impregnated with a liquid resin composition using a vacuum pressure impregnation method. Here, a composition constituted by 100 pts. by mass of bisphenol A type epoxy resin (product name Epicode 828, manufactured by Japan Epoxy Resins Co., Ltd.) and 93 pts. by mass of a methyl tetra hydro phthalic anhydride hardener (product name HN-2200, manufactured by Hitachi Chemical Co. Ltd.) was used as the resin composition.

Finally, a stator coil was manufactured by clamping the coil conductor using a jig such that the layer thickness of the insulating tape impregnated with the resin composition was 4.26 mm and then hardening the resin composition by heating the coil conductor in a drying oven.

Example 2

Secondary agglomerates of boron nitride having an average particle diameter of 60 μm were used as the filler. Otherwise, the insulating tape and the stator coil were manufactured similarly to Example 1.

Comparative Example 1

The flat sheet layer was not formed. Otherwise, the insulating tape and the stator coil were manufactured similarly to Example 1.

Comparative Example 2

The thickness of the glass cloth was modified to 75 μm, and mica particles (flat sheet-shaped inorganic particles) having an aspect ratio of 20 were used. Otherwise, the insulating tape and the stator coil were manufactured similarly to Example 1.

The thermal conductivity and dielectric breakdown voltage of the insulating coatings of the stator coils obtained in the examples and comparative examples described above were then measured as follows.

The thermal conductivity of the insulating coating was measured by cutting out a test piece of the insulating coating from the stator coil and using a thermal conductivity measurement apparatus (a xenon flash analyzer, LFA447 Nano-Flash (registered trademark), manufactured by NETZSCH) on the cut out test piece of the insulating coating. Further, the dielectric breakdown voltage of the insulating coating was measured on the basis of a method described in JIS-C2126. Results are shown on Table 1.

TABLE 1

|  | Aspect ratio of flat sheet-shaped inorganic particles | Thermal conductivity of insulating coating (W/mK) | Dielectric breakdown voltage of insulating coating (kV) |
|---|---|---|---|
| Example 1 | 200 | 0.55 | 27 |
| Example 2 | 200 | 0.54 | 28 |
| Comparative Example 1 | — | 0.4 | 27 |
| Comparative Example 2 | 20 | 0.4 | 27 |

As shown on Table 1, the insulating coatings of the stator coils manufactured in the examples had both a dielectric breakdown voltage of at least 25 kV and a thermal conductivity of at least 0.5, and therefore both the dielectric breakdown voltage and the thermal conductivity thereof were favorable.

On the other hand, although the insulating coatings of the stator coils manufactured in the comparative examples had a dielectric breakdown voltage of at least 25 kV, the thermal conductivity thereof was low.

As is evident from these results, according to the present invention, it is possible to provide an insulating tape and a manufacturing method thereof with which a filler supported in advance is prevented from flowing out during manufacture of a stator coil (during hot-pressing in particular), whereby an insulating coating exhibiting high thermal conductivity can be formed. Moreover, according to the present invention, it is possible to provide a stator coil having an insulating coating that exhibits high thermal conductivity.

The invention claimed is:

1. An insulating tape comprising:
a mica layer containing mica;
a reinforcing layer that is laminated onto said mica layer and contains a filler and a fibrous reinforcing material; and
a flat sheet layer that is laminated onto said reinforcing layer and contains flat sheet-shaped inorganic particles having an aspect ratio of at least 30.

2. The insulating tape according to claim 1, wherein an average long diameter of said flat sheet-shaped inorganic particles is greater than an average particle diameter of said filler.

3. The insulating tape according to claim 1, wherein said average long diameter of said flat sheet-shaped inorganic particles is at least 80 μm.

4. The insulating tape according to claim 1, wherein said flat sheet-shaped inorganic particles are mica.

5. The insulating tape according to claim 1, wherein thermal conductivity of said filler is at least 5 W/mK.

6. The insulating tape according to claim 1, wherein said filler is boron nitride.

7. A method for producing an insulating tape, comprising:
forming a mica layer by forming a dispersion containing mica into a sheet;
forming a reinforcing layer by gluing a fibrous reinforcing material to said mica layer and then coating said fibrous reinforcing material with a slurry containing a filler; and
forming a flat sheet layer by coating said reinforcing layer with a slurry containing flat sheet-shaped inorganic particles having an aspect ratio of at least 30.

8. A stator coil comprising:
a coil conductor; and
an insulating coating including the insulating tape according to claim 1, which is wrapped around an outer peripheral portion of said coil conductor, and integrated with said coil conductor by a resin.

9. The insulating tape according to claim 1, wherein the reinforcing layer is a layer in which the filler is trapped in openings surrounded by warp threads and weft threads of the fibrous reinforcing material.

10. The method for producing an insulating tape according to claim 7, wherein the formed reinforcing layer is a layer in which the filler is trapped in openings surrounded by warp threads and weft threads of the fibrous reinforcing material.

* * * * *